Figure 1:
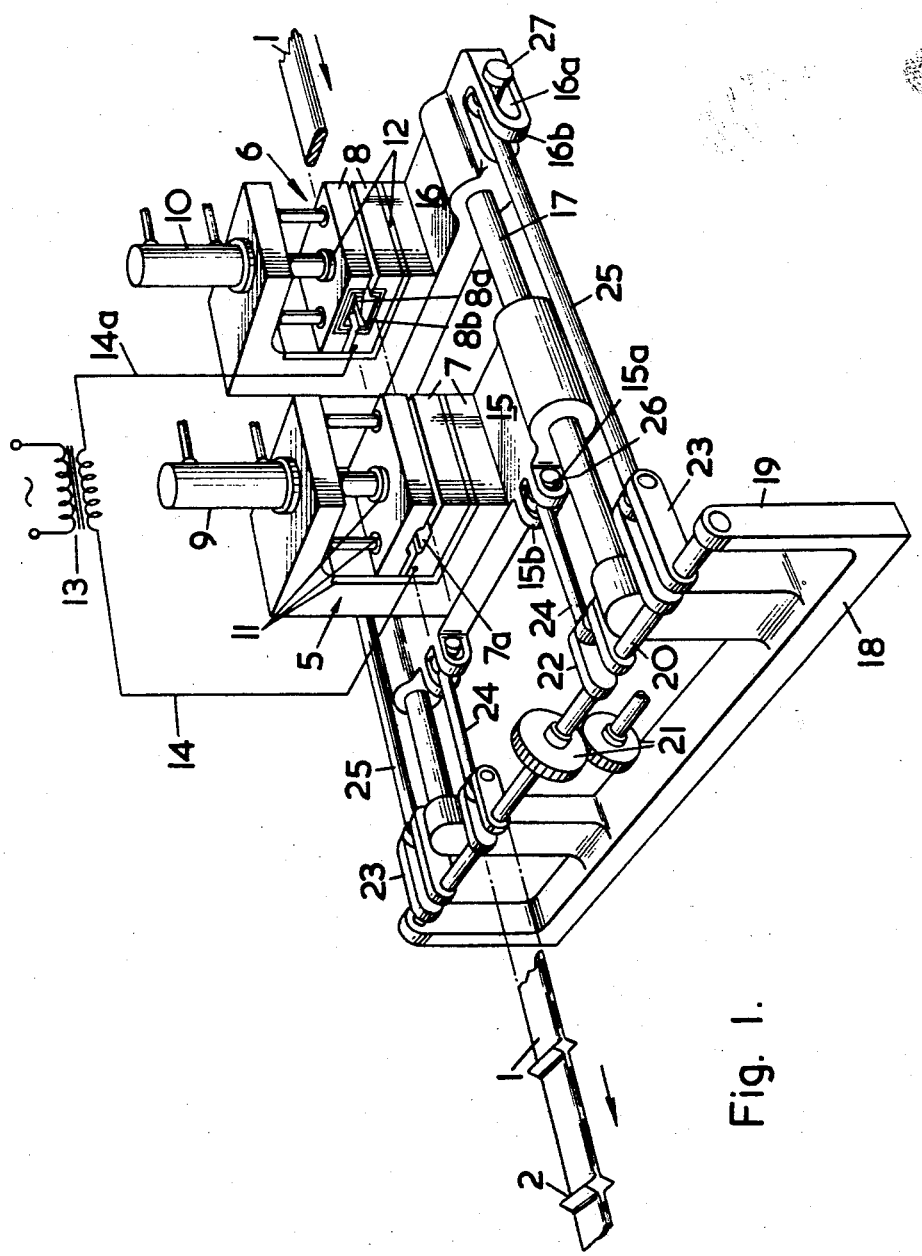

Feb. 21, 1961  W. S. HOLLIS ET AL  2,972,181
PROCESS FOR MAKING TURBINE BLADES
Filed July 9, 1953  4 Sheets-Sheet 2
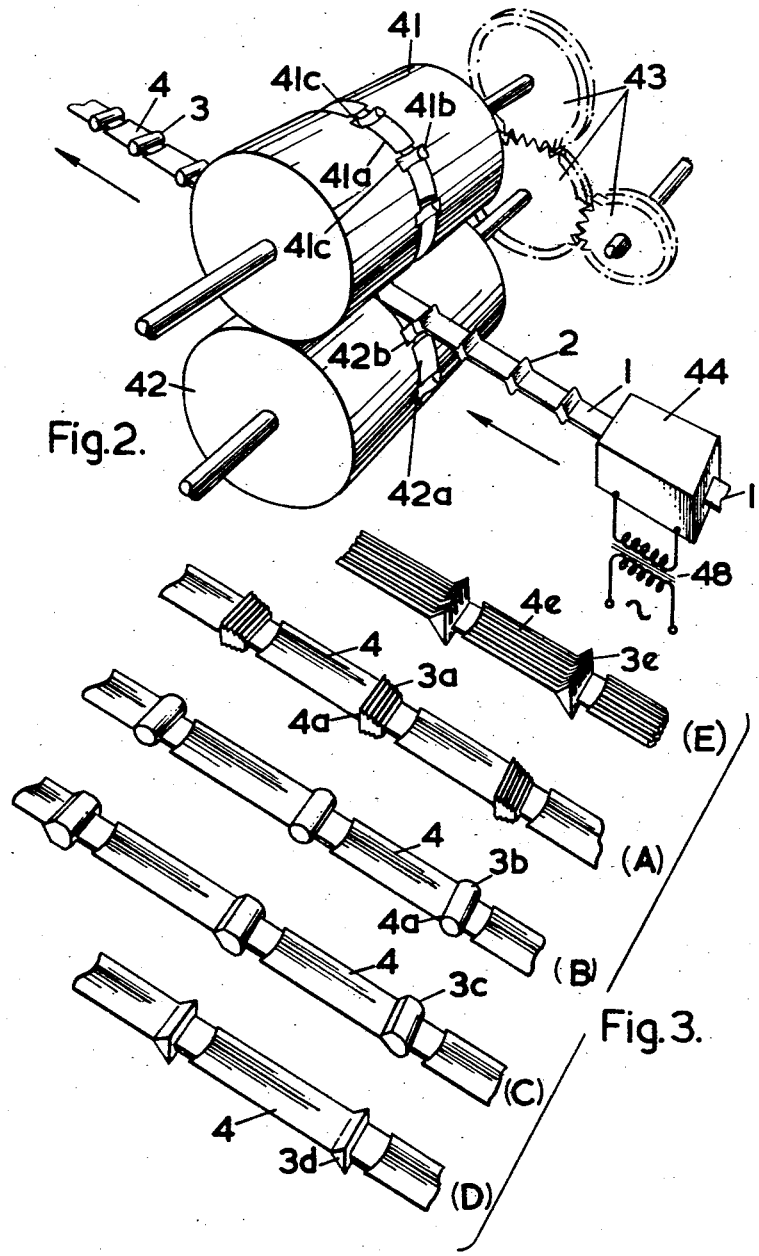

Feb. 21, 1961  W. S. HOLLIS ET AL  2,972,181
PROCESS FOR MAKING TURBINE BLADES
Filed July 9, 1953  4 Sheets-Sheet 3

William Stephen Hollis
John Owen Mayer
Inventors

By
Stevens, Davis, Miller & Mosher
their Attorneys

Feb. 21, 1961   W. S. HOLLIS ET AL   2,972,181
PROCESS FOR MAKING TURBINE BLADES
Filed July 9, 1953   4 Sheets-Sheet 4

William Stephen Hollis
John Owen Mayer
Inventors

By
Stevens, Davis, Miller + Mosher
their Attorneys

United States Patent Office 2,972,181
Patented Feb. 21, 1961

2,972,181
PROCESS FOR MAKING TURBINE BLADES

William Stephen Hollis, Banstead, and John Owen Mayer, West Drayton, England, assignors to Power Jets (Research and Development) Limited, London, England, a British company Filed July 9, 1953, Ser. No. 366,998

Claims priority, application Great Britain July 11, 1952

4 Claims. (Cl. 29—156.8)

Turbine and like blades suitable for use in steam or gas turbines as well as in axial-flow and similar bladed compressors have been made by a process involving a series of forging operations. The first step is the local electric heating and upsetting of one end of a metal rod or bar to form an enlargement which is eventually shaped to form the blade root. Such a process, involving a number of discrete operations interrupted while the work is moved piece by piece from one machine to another, may be called a discontinuous process.

Blades have also been made by cutting them from a continuously rolled aerofoil-section strip; and furthermore, roots could be formed on such blades by a series of forging operations commencing with the step of upsetting as described above. Although the production of the aerofoil blade form is continuous, the formation of the root is entirely by steps of a discontinuous process. The blade must be of constant cross-section, but twist can be imparted to each blade by twisting it relatively to its root.

It has been proposed to make blades with roots continuously as a series in a metal strip, which is heated and passed through a pair of rolls which are indented with moulds in the form of a blade with a root.

Combinations of forging operations to produce the root with rolling operations to produce the aerofoil form of separate blades have also been proposed.

The purpose of the present invention is to provide a blade-making process which, at least after an initial root-forming step, rolls the blades with root portions in a continuous series—preferably but not necessarily from a continuous metal strip. The term "strip" is here used to include a rod or bar of cross-sectional area suitable for forming the blade and long enough for the formation of a number of blades. A considerable radius is preferably formed where the working portion of the blade merges into the root, and some variation may be provided in the cross-section of the blade along its length.

According to the invention a process for making blades for use in steam or gas turbines or in axial flow and similarly bladed compressors is characterised by the preliminary step of preparing a succession of blanks for rolling by taking a continuous strip of metal of a cross section to suit rolling to the desired blade section, locally heating the strip, subjecting two spaced parts of the strip to a longitudinal displacement in the same direction at different speeds so as to cause said spaced parts to approach one another thereby to upset the strip into enlargement ultimately to form at least a part of the root of each blade and subsequently passing the upset strip through blade forming rolls.

The invention is illustrated by the accompanying drawings, of which—

Figure 4:
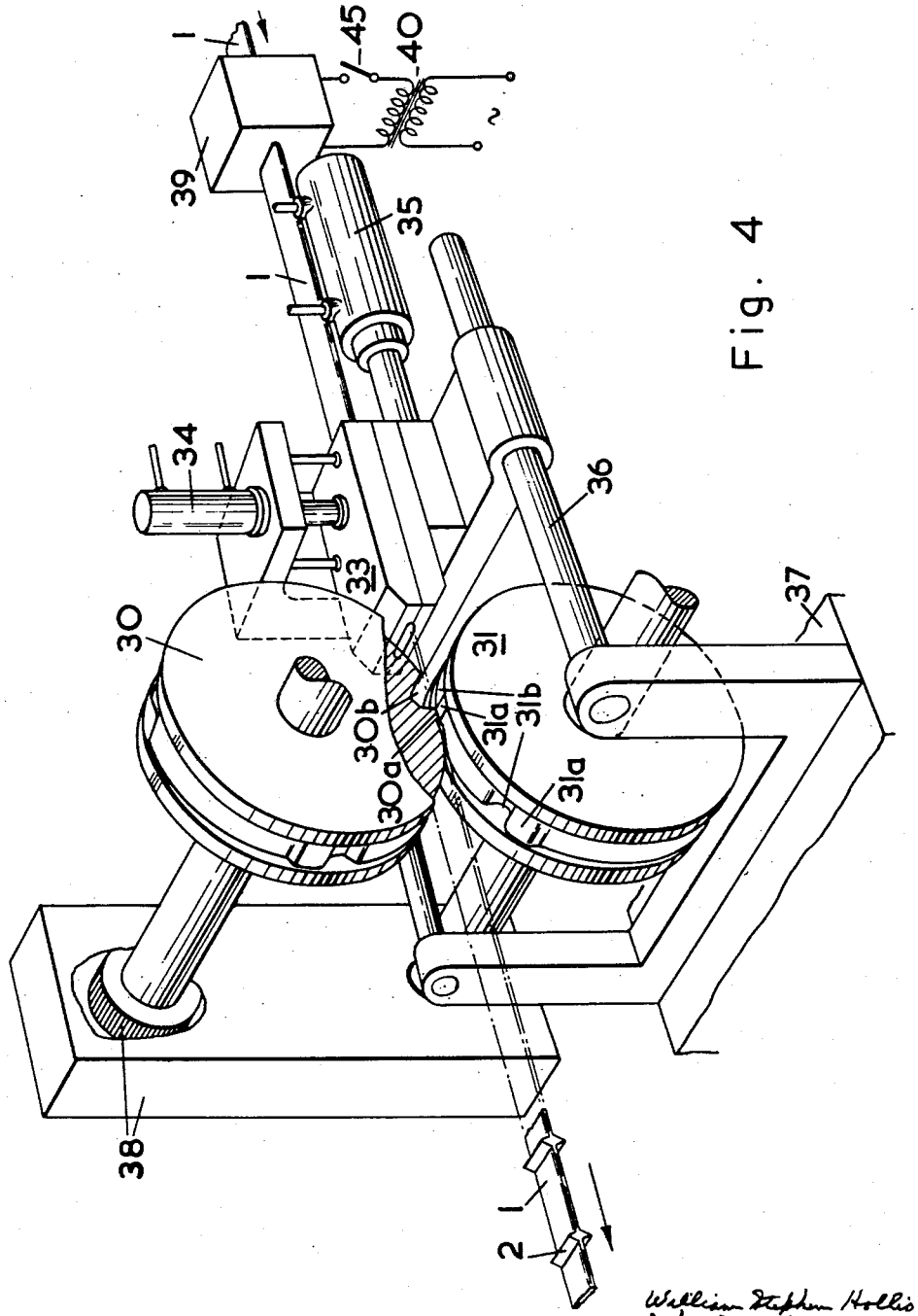
Figure 5:
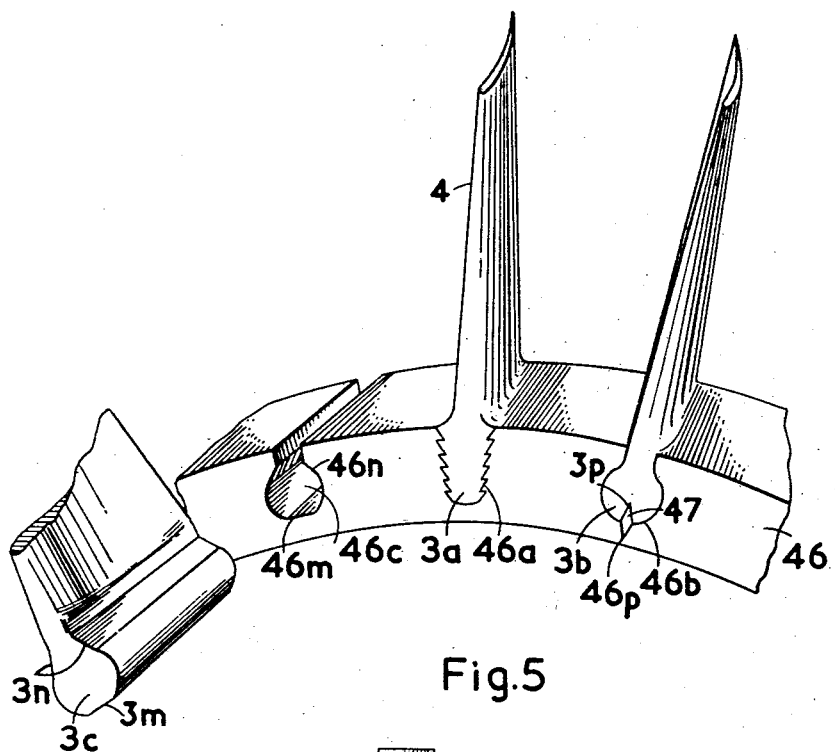
Figure 6:
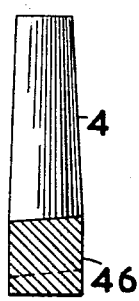

Fig. 1 illustrates one method of upsetting metal strip to form the enlargements, Fig. 2 shows the next stage of rolling of blades from the strip received from the device shown in Fig. 1, Fig. 3 shows typical examples of types of blade produced by the process, Fig. 4 illustrates an alternative method of upsetting the metal strip, Fig. 5 shows how the finished blades are seated in a strip which may ultimately form the rim of a rotor, and Fig. 6 is a cross section through the seating strip of Fig. 5.

In one particular process according to the invention as illustrated by Figs. 1 and 2, a metal strip 1 which has, before it enters the device shown in Fig. 1, a cross-section chosen to suit rolling to the desired blade section, is repeatedly upset at intervals in this device to form a series of enlargements 2 spaced at constant pitch along its length. The upset strip from here is then passed through the indented rolls of Fig. 2 to form, between pairs of enlargements 2, the desired section of each blade 4 and also to form the blade root portions 3—at least partially—from the enlargements 2.

For forming the enlargements, two vices 5 and 6 which are spaced apart by a short distance can grip the strip 1 without slipping, by vice blocks 7 and 8 closed by hydraulic actuators 9 and 10, and then approach each other to enlarge the strip between them while the strip is hot. Heating is done in well-known manner by passing electric current from the transformer 13 through leads 14 and 14a and so through the part of the strip 1 between the two vice-blocks, which latter serve as the current-feeding electrodes. The vice-blocks 7 and 8 are insulated from the rest of the vices 5 and 6 at 11 and 12. The mechanism for moving the vices allows current to pass for sufficient time to heat the metal strip before the upsetting begins. High-frequency induction heating may alternatively be used as set forth hereinafter. After upsetting the strip, the vice-blocks 7 and 8 release their grip and are separated by the actuators 9 and 10; the strip moves forward through the required pitch relatively to the vices before they again grip the strip and repeat the operation for forming the next enlargement, and so on.

The process could involve step-by-step motion of the strip between each upsetting operation. In order however to keep up continuous motion so that the strip can move continuously through the device of Fig. 1 and the rolls of Fig. 2 in succession, the vices are carried by platforms 15 and 16 which can move with the strip while the vices are gripping and which, after the vices release their grip, can move back to their initial position ready for the vices to grip the strip again. Both platforms are slidably mounted on the guides 17 carried by the stationary structure 18 which also carries bearings 19 supporting crankshaft 20 which is driven through gearing 21 and carries short cranks 22 and long cranks 23. Each pair of cranks 22 is connected by a connecting-rod 24 to the platform 15, the pin 26 on each connecting-rod 24 being in an elongated hole 15a in the forked part 15b of the platform. Similarly each pair of long cranks 23 is connected by a connecting-rod 25 to the platform 16, the pin 27 on rod 25 being in a slot 16a in the forked part 16b of the platform; slot 16a is longer than elongated hole 15a. The difference between the throw of cranks 22 and cranks 23, is equal to the maximum distance between the vices where fully separated, as shown.

When the cranks are at 180° to the position shewn, the vices will have come together; to leave space in which the upset can be formed the vice-blocks must be set back, either wholly or by being recessed as shewn in vice-block 8 at 8b, which is the entry to the cavity 8a between the pair of blocks. The adjacent entry to the cavity in vice-block 7 may be similar. The blocks 8 are curved at the entry to 8a to provide for the desired considerable radius where eventually the blade will merge into its root portion.

The strip 1 to which the process is to be applied is assumed to be of the said cross-section chosen to suit the ultimately desired blade section. As the strip material will usually be initially of some symmetrical section considerably different from the final blade section, and in particular of circular section, the strip will be reduced to the said chosen cross-section by flattening rolling before upsetting. Where blades tapering along their length are to be rolled, rotary swaging of the strip is also carried out, and preferably before the flattening, to produce a strip made up of a succession of portions tapering from maximum to minimum width or diameter and then merging into the maximum of the next portion. The strip 1 thus or otherwise prepared is then threaded through the vices 5 and 6—which are open—and so to feeding rolls, which can be the rolls hereinafter to be described with reference to Fig. 2, into which they are inserted. With the roling mill running and the strip being drawn through at a linear speed determined by the rolls, and when the cranks 22 and 23 are in the position just past the dead center position shown in Fig. 1, the two vices are closed. The vice blocks 7 and 8 grip the strip, completing the electrical circuit from the transformer 13, so that heating current flows through a short length of the strip. The vices will then be travelling at the speed of the strip. The short cranks 22 are of such length and are driven at such speed that over an intermediate angle of travel while the upsetting is being done the speed at which the platform 15 is driven by cranks 22 is not at any time much different from the speed of the strip. Initial movement of the vices will take up some of the clearance of pins 26 and 27 in slots 15a and 16a. As the speed of pin 27, driven by the long cranks 23, begins to exceed the speed of the strip, the pin 27 moves along the slot 16a until it reaches the end of the slot and can drive the platform 16. During this time interval after closure of the vices, determined by the length of slot 16a, the moving strip is merely being heated. Now the platform 16 will move faster than the strip and platform 15 and the two vices moving closer together will upset the locally heated strip. Before the cranks reach the outer dead centre the vices are released, the vice block 7 being opened sufficiently to pass the enlargement formed by the upsetting; the strip is thus left free to travel and the vices are left free to be returned to their initial position by the next 180° of movement of the cranks.

The strip from the device of Fig. 1 proceeds through the rolls of Fig. 2 hereinafter described.

The form of device shewn in Fig. 1 is considered to be preferable to one in which pairs of vices movable towards and away from each other are movably mounted on the peripheral part of a large wheel rotated at a peripheral speed equal to the linear speed of the strip. In another modification of Fig. 1, as shewn in Fig. 4, the upsetting is performed by passing the strip 1 through rolls 30 and 31 which indent the strip across its width as it passes the recesses 30b and 31b. This indentation occurs at regular intervals, at the positions where eventually the tip of one blade will be separated from the root of the next in the series. The indenting rolls 30 and 31 each have a somewhat abrupt shoulder 30a and 31a facing the oncoming strip, at the beginning of each recess 30b and 31b, to serve as an abutment for upsetting the strip 1. Just as the indentation is being made in the strip, a vice 33 which is closed by the hydraulic actuator 34 and rapidly reciprocated by the hydraulic actuator 35 synchronised with the rolls 30 and 31 grips the strip 1 at a short distance from the entry to the rolls and moves along guides 36 to compress the strip towards the shoulders 30a and 31a, thereby upsetting the strip to form an enlargement. Heating of the strip is effected electrically, as before, either by passing electric current through the strip between the vice and the rolls, which thus serve as electrodes, or, as shewn, by high frequency induction heating by device 39 supplied from transformer 40 through switch 45. After effecting the upsetting, the grip of the vice is released by an actuator 34, and actuator 35 moves the vice backwards ready to repeat the operation. Each blade will be passing root first through the rolling mill, the vice will as before form the large radium between root and blade. The enlarging operation can be combined with the flattening rolling of the circular of like stock, the said indenting rolls also performing this flattening, wholly or partly. The guides 36 are supported by structure 37. The rolls are driven by gearing 38, which, like gearing 21 of Fig. 1 is in driving relationship with gearing 43 of Fig. 2.

The strip 1 preformed by the addition of enlargements 2 next passes from the device of Fig. 1 or Fig. 4 to the rolling mill consisting of one or more pairs of the rolls 41 and 42 driven by gearing 43, as shewn in Fig. 2. In their work faces, which may be made up of removable die inserts, these rolls have complementary recesses 41a and 42a which are shaped to impart—possibly in successive stages—the desired section to the working part of the blade. Each recess includes an enlargement 41b or 42b to receive the enlargements 2 on the strip 1 and shape them partially or finally to the required root portions 3. In contrast with a previously proposed rolling process the rolls do not have to work on uniform section strip of section suitable for forming the root, rolling this section down to the aerofoil size over successive lengths while forming the roots between these lengths; the rolls 41 and 42 have only to work on and eventually finish off strip already preformed to lengths suitable for forming the working portions of the blades, separated by enlargements 2 suitable for forming the roots 3. This operation may be cold rolling or hot rolling, depending upon the alloy from which the blades are being made. For hot rolling, the strip can be heated by passing current along it between the rolls and roller electrodes engaging the strip before it enters the rolls; preferably high frequency induction heating is effected, as shewn, by passing the strip through a heating device 44 (suppled from transformer 48) prior to its entry into the rolls. In multi-stage rolling, the strip may be reheated similarly between adjacent rolls. At least the first of the rolls 41 and 42 may have their recesses 41a and 42a shaped to widen the strip in rolling it down to aerofoil shape or approximate aerofoil shape, and enlargements 41b and 42b which may compress the enlargements 2 of the preformed strip to effect a corresponding widening of the root portions. The transition from the one part of each recess to the other is curved as at 41c to further form the radius between the blade portion and the root portion.

When the blades 4 with roots 3 are formed, each in turn is parted off from the rest—e.g. by a rotary slitting tool which, in order not to interrupt the continuity of the process, travels along in usual manner with the strip while cutting, and then travels back to a position for cutting off the next blades.

There may be a certain amount of machining of the working part of the blade or of the root for finishing off the blade after the application of the invention but it is contemplated that at least any aerofoil section should be finished off entirely by rolling. The leading and trailing edges can be finished off in accurate relationship to the rest of the aerofoil section by some suitable process before or after parting off e.g. the blades may pass through edge rolls which are guided by the rest of the aerofoil section and which act as set forth in British patent specification No. 660,282.

The invention is applicable to the making of various forms of blade and root portions as shown in Fig. 3. Thus for example the rolling may produce a tapered root which is or can utlimately be serrated to form a conventional fir-tree root 3a as shown at A; the serrations can be machined in the root after the individual blade has been parted off or they can be formed by a rolling process as set forth in British patent specification No. 648,783.

Alternatively the rolling may produce a bulb root, as shown at B, the upsetting operation preforming the strip 1 to roughly formed bulbous enlargements 2 which are very readily modified, by rolling, to the final bulbous root shape 3b. For accurately locating the blade in the stator or rotor of the machine this root may be machined as set forth hereinafter.

A modified form of bulbous root 3c may be formed as shown at C for machining and fixing as hereinafter set forth.

These examples are of blades with complete conventional roots formed by rolling. The process according to the invention can be used when the enlargement is for forming only part of a blade root—e.g. a small root-portion shaped, preferably entirely by upsetting and rolling according to invention without further machining, to fit in a dovetailed, or in an undercut and shouldered groove in a root block or to fit two blocks which can be aligned on each side of it, to complete the root, more especially where the whole root is desired to be larger than can be conveniently formed by rolling alone. By way of example, D in Fig. 3 shows at 3b such a root portion, which can fit in a dovetailed groove in a root block, or can serve as a foot which is to be held in some way other than by being rooted in the rotor or stator.

The invention may also be used to roll an integral root, part root or foot on a fluted core, or to roll with the fluted core an integral root, part root or foot, for a blade which is to carry, around the core, a porous sheath for so-called "sweat" cooling, as is for example set forth in British patent specification No. 619,634. An example is shown at E in Fig. 3 where the blade portion is a fluted core 4e with the flutes continuing through the root or foot 3e.

Individual blades, after parting off, can pass step by step through a machine which grips each by the root and by the tip and imparts some desired twist to the working portion of the blade. It will be understood that the recesses 41a and 42a in the blade-forming rolls 41 and 42 may taper to some extent to form blades with tapering chord and thickness; the two rolls may also be unequally indented so as to produce twisted blades. It may facilitate this production of a twisted form if the blades be parted off at some stage before they enter the rolls 41 and 42 or at least before they enter the last of such rolls in a multi-stage operation; they will, of course, continue to be fed into and through the rolls as a continuous series. In a partly discontinuous process, rods upset and possibly partly forged at the root portion by the first stage of the above described known blade forging process can be passed in a continuous series end-to-end through the rolls 41 and 42.

Blades made by the process according to the invention can be inserted in usual manner in seatings in a stator ring or rotor rim. This annular part of the stator or rotor may be formed as a separate rolled or extruded strip such as strip 46 of Figs. 5 and 6, provided with seatings 46a, 46b, 46c . . . which may for example be broached or milled to correspond to the blade root, after being bent to the necessary radius, ready for attachment to the stator or rotor. Three examples of roots are shown, which are the fir-tree root 3a, the bulb root 3b and the modified root 3c of Fig. 3. The first two are shown in place in their seatings. The blade with root 3c is however shown (in part) in position for sliding sideways into its seating 46c. To locate this blade accurately, a flat is machined on the bottom of the root at 3m and two other flats similarly formed, inclined to each other on the upper part of the root at 3n; similarly flats 46m and 46n are formed when machining out the blade seatings 46c, the flats on the root bearing against those on the seating when the root is inserted. To locate the blade with the bulb root 3b, an upwardly pointing V notch 3p is machined in the bottom of the root, and a corresponding notch 46p in the bottom of the seating 46b; a retaining member 47 inserted sideways into notches 3p and 46p locates the root in the seating either rigidly or with such clearance as to allow slight relative angular movement of the root around the axis of the bulb portion and so permit a slight tip rock of the blade.

Preferably in all the above forms of the process of blade forming, the root portions are formed obliquely across the material at an angle to the blade portion to suit the required platform angle of the blades. In the figures the enlargements 2 and the roots 3, 3a etc. are shown at 5° to the perpendicular to the strip and blades. The seating strip 46 is of wedge shaped cross-section as shown in Fig. 6, to provide the necessary platform angle, shown also as 5°, so that after the insertion the blade will be in a position for standing normal to the axis of the complete machine—i.e. turbine or compressor. The strip 46 may make a ring, or it may be divided into segments if it serves only to provide platforms separate from the rotor rim or stator ring on which the blades are mounted.

What we claim is:

1. A rolling process for making blades for use in steam or gas turbines or in axial flow and similarly bladed compressors which is characterised by the preliminary step of preparing a succession of blanks for rolling by taking a continuous strip of metal of a cross section to suit rolling to the desired blade section, locally heating the strip, subjecting two spaced parts of the strip to a longitudinal displacement in the same direction at different speeds so as to cause said spaced parts to approach one another thereby to upset the strip into enlargements, ultimately to form at least a part of the root of each blade and subsequently passing the upset strip through blade-forming rolls.

2. A process of making blades suitable for use in steam or gas turbines or in axial-flow and similar bladed compressors which comprises preparing a succession of blade blanks by taking a continuous strip of blade material of a cross sectional area less than that of a blade root, heating a locality along the strip, applying a clamping pressure to the strip at two spaced positions in said locality, causing the clamped parts of the strip to approach one another to effect upsetting of the heated strip, repeating the upsetting process at a number of evenly spaced points along the length of the strip to form a series of enlargements which ultimately form at least part of the root of each blade and subsequently shaping said blade blanks to blade form.

3. The process of making blades for use in steam or gas turbines or in axial flow and similar bladed compressors which comprises preparing a succession of blade blanks by taking a continuous strip of blade metal of cross sectional area less than that of the blade root, causing the strip to move continuously in a longitudinal direction, upsetting the moving strip repeatedly at intervals by applying a clamping pressure to the strip at two spaced, forward and rearward, positions along the moving strip, accelerating the rearward clamped part of the strip towards the forward clamped part thus to effect an upsetting of the strip between the two clamped parts to form enlargements which ultimately form at least part of the root of each blade and subsequently shaping each blade to blade form.

4. The process of making blades for use in steam or gas turbines or in axial flow and similar bladed compressors which comprises preparing a succession of blade blanks by taking a continuous strip of blade metal of cross sectional area less than that of the blade root, applying an interrupted longitudinal motion to the strip by passing the strip through intermittently rotated rolls; causing the strip to be heated continuously prior to its entry between the rolls, subjecting a heated part of the strip to a gripping pressure, intermittently advancing the gripped part of the strip towards the rolls while the latter are stationary to effect an upsetting of the strip at intermediate spaced positions therealong to form enlargements which ultimately form at least part of the root of each blade and subsequently shaping each blade to blade form.

References Cited in the file of this patent

UNITED STATES PATENTS

| | | |
|---|---|---|
| 1,187,445 | Marquis | June 13, 1916 |
| 1,448,001 | Refior | Mar. 13, 1923 |
| 1,547,836 | Steenstrup | July 28, 1925 |
| 1,572,343 | Witherow | Feb. 9, 1926 |
| 1,740,800 | Wiberg | Dec. 24, 1929 |
| 1,841,920 | Smith | Jan. 19, 1932 |
| 2,006,764 | Hudson | July 2, 1935 |
| 2,013,622 | Bedford | Sept. 3, 1935 |
| 2,018,013 | Ericsson | Oct. 22, 1935 |
| 2,157,679 | Schmidt | May 9, 1939 |
| 2,163,531 | Wettstein | June 20, 1939 |
| 2,254,629 | Stine | Sept. 2, 1941 |
| 2,473,245 | Hanna | June 14, 1949 |
| 2,613,058 | Atkinson | Oct. 7, 1952 |
| 2,738,571 | Turnbull | Mar. 20, 1956 |
| 2,743,509 | Friedman | May 1, 1956 |

FOREIGN PATENTS

| | | |
|---|---|---|
| 83,535 | Switzerland | Dec. 16, 1919 |